United States Patent
Brehm et al.

(10) Patent No.: US 10,744,425 B2
(45) Date of Patent: Aug. 18, 2020

(54) DEFOAMING COMPOSITIONS FOR DETERGENTS

(71) Applicant: Wacker Chemie AG, Munich (DE)

(72) Inventors: Christof Brehm, Burghausen (DE);
Richard Becker, Ann Arbor, MI (US);
Holger Rautschek, Nuenchritz (DE)

(73) Assignee: WACKER CHEMIE AG, Munich (DE)

( * ) Notice: Subject to any disclaimer, the term of this patent is extended or adjusted under 35 U.S.C. 154(b) by 126 days.

(21) Appl. No.: 15/742,439

(22) PCT Filed: Feb. 20, 2017

(86) PCT No.: PCT/EP2017/053747
§ 371 (c)(1),
(2) Date: Jan. 5, 2018

(87) PCT Pub. No.: WO2017/148723
PCT Pub. Date: Sep. 8, 2017

(65) Prior Publication Data
US 2018/0193771 A1    Jul. 12, 2018

(30) Foreign Application Priority Data

Mar. 1, 2016  (DE) .................. 10 2016 203 346

(51) Int. Cl.
| | | |
|---|---|---|
| B01D 19/04 | (2006.01) | |
| C08L 83/06 | (2006.01) | |
| C11D 3/00 | (2006.01) | |
| C11D 3/12 | (2006.01) | |
| C11D 3/16 | (2006.01) | |
| C11D 3/37 | (2006.01) | |
| C08L 83/04 | (2006.01) | |
| C08G 77/18 | (2006.01) | |
| C08G 77/16 | (2006.01) | |

(52) U.S. Cl.
CPC ....... B01D 19/0409 (2013.01); B01D 19/044 (2013.01); B01D 19/0404 (2013.01); B01D 19/0431 (2013.01); C08L 83/04 (2013.01); C11D 3/0026 (2013.01); C11D 3/124 (2013.01); C11D 3/162 (2013.01); C11D 3/373 (2013.01); C08G 77/16 (2013.01); C08G 77/18 (2013.01)

(58) Field of Classification Search
CPC .......................... B01D 19/0409; C08G 77/80
USPC ........................................................ 516/113
See application file for complete search history.

(56) References Cited

U.S. PATENT DOCUMENTS

| | | |
|---|---|---|
| 3,383,327 A | 5/1968 | Sullivan |
| 3,830,738 A | 8/1974 | Cottrell |
| 6,197,914 B1 | 3/2001 | Kaeppler et al. |
| 6,605,183 B1 | 8/2003 | Rautschek et al. |
| 2004/0106749 A1 | 6/2004 | Burger et al. |
| 2008/0021152 A1 | 1/2008 | Rautschek et al. |
| 2008/0200608 A1 | 8/2008 | Burger et al. |
| 2011/0209291 A1 | 9/2011 | Sadlowski et al. |
| 2015/0240189 A1 | 8/2015 | Panandiker et al. |
| 2016/0121239 A1 | 5/2016 | Brehm et al. |

FOREIGN PATENT DOCUMENTS

| | | |
|---|---|---|
| CN | 105307744 A | 2/2016 |
| CN | 106062078 A | 10/2016 |
| DE | 1519987 | 4/1970 |
| DE | 2107082 | 8/1971 |
| EP | 0887097 A1 | 12/1998 |
| EP | 0927733 A1 | 7/1999 |
| EP | 1060778 A1 | 12/2000 |
| EP | 1075863 A2 | 2/2001 |
| EP | 1075864 A2 | 2/2001 |
| EP | 1076073 A1 | 2/2001 |
| EP | 1424117 A2 | 6/2004 |
| GB | 2350117 A1 | 11/2000 |
| WO | 2006018145 A1 | 2/2006 |
| WO | 2006128624 A1 | 12/2006 |
| WO | 2014066308 A1 | 5/2014 |
| WO | 2014066309 A1 | 5/2014 |
| WO | 2015022165 A1 | 2/2015 |

*Primary Examiner* — Marc S Zimmer
(74) *Attorney, Agent, or Firm* — Brooks Kushman P.C.

(57) ABSTRACT

Effective defoamer compositions contain two different aryl-substituted organopolysiloxanes and filler particles, and show high defoaming capability.

18 Claims, No Drawings

DEFOAMING COMPOSITIONS FOR DETERGENTS

CROSS REFERENCE TO RELATED APPLICATIONS

This application is the U.S. National Phase of PCT Appln. No. PCT/EP2017/053747 filed Feb. 20, 2017, which claims priority to German Application No. 10 2016 203 346.8 filed Mar. 1, 2016, the disclosures of which are incorporated in their entirety by reference herein.

BACKGROUND OF THE INVENTION

1. Field of the Invention

The invention relates to defoamer compositions comprising organosilicon compounds having SiC-bonded aromatic hydrocarbyl radicals, and also to the use thereof for the defoaming of media, preferably aqueous media, more particular aqueous surfactant formulations.

2. Description of the Related Art

In many liquid systems, especially aqueous systems in which surface-active compounds are present either as wanted or else unwanted constituents are present, problems due to foaming may occur if these systems are brought into more or less intensive contact with gaseous substances, as for example when gasifying wastewaters, when intensively stirring liquids, in distillation, washing or coloring operations, or during dispensing procedures.

Controlling this foam may be accomplished mechanically or through the addition of defoamers. In the latter context, siloxane-based defoamers have proven to be particularly useful. Siloxane-based defoamers are prepared, for example according to DE-B 15 19 987, by heating hydrophilic silica in polydimethylsiloxanes.

In vigorously foaming, surfactant-rich systems, however, polydimethylsiloxane-based defoamer formulations do not always have sufficiently long-lasting activity. On account of their high viscosities, present due to branching or crosslinking, they are often difficult to handle. This problem has been counteracted by the introduction of functionalized polysiloxanes as a basis for defoamer formulations. Functionalization may comprise arylalkyl functionalities (as described in EP 1 075 864 A2 or EP 1 075 863 A2) and also n-alkyl or aryl functionalities (as described in WO 2006/018145 A1).

WO 2006/018145 A1 describes defoamer compositions which contain only one type of phenyl siloxane.

SUMMARY OF THE INVENTION

It has now been surprisingly discovered that defoamer compositions based on two different kinds of phenyl siloxanes exhibit much better defoamer activity than is the case for defoamer compositions consisting only of one kind of phenyl siloxane. A subject of the invention is therefore defoamer compositions comprising (A1) organosilicon compounds comprising units of the formula $$R_a(R^1O)_b R^2_c SiO_{(4-a-b-c)/2} \qquad (I),$$

in which

R may be identical or different and is a hydrogen atom or a monovalent, SiC-bonded, optionally substituted hydrocarbyl radical which is aliphatic or which is aromatic and is bonded via aliphatic groups to the silicon atom, $R^1$ may be identical or different and is a hydrogen atom or a monovalent, optionally substituted hydrocarbyl radical, $R^2$ may be identical or different and is a monovalent, optionally substituted, aromatic hydrocarbyl radical which is attached via a ring carbon atom to the silicon atom, a is 0, 1, 2 or 3, preferably a is 0, 1 or 2,
b is 0, 1, 2 or 3, and
c is 0 or 1,
with the proviso that
the sum a+b+c is less than or equal to 3,
in at most 80%, preferably at most 70%, more preferably at most 50% of all units of the formula (I), the sum a+c is 2,
in at least 20%, preferably at least 30%, more preferably at least 40% of all units of the formula (I), the sum a+c is 1, and
in more than 10%, preferably more than 20%, more preferably more than 40% of all units of the formula (I), c is 1, and also preferably in at most 100%, more preferably in at most 90%, very preferably in at most 75%, of all units of the formula (I), c is 1, (A2) organosilicon compounds comprising units of the formula $$R_{a'}(R^1O)_{b'} R^2_{c'} SiO_{(4-a'-b'-c')/2} \qquad (II),$$

in which
R, $R^1$ and $R^2$ have the definition stated for them above,
a' is 0, 1, 2 or 3,
b' is 0, 1, 2 or 3, and
c' is 0, 1, 2 or 3,
with the proviso that
the sum a'+b'+c' is less than or equal to 3,
in more than 80%, preferably more than 90%, of all units of the formula (II) the sum a'+c' is 2,
in at most 10%, preferably at most 5%, of all units of the formula (II) the sum a'+c' is 1, and
in 1-100%, preferably in 10-85%, more preferably in 20-70% of all units of the formula (II) c' is other than 0, (B) adjuvants
selected from
(B1) filler particles and/or
(B2) organopolysiloxane resins consisting of units of the formula $$R^3_d(R^4O)_e SiO_{(4-d-e)/2} \qquad (III),$$

in which
$R^3$ may be identical or different and is a hydrogen atom or a monovalent, optionally substituted, SiC-bonded hydrocarbyl radical,
$R^4$ may be identical or different and is a hydrogen atom or a monovalent, optionally substituted hydrocarbyl radical,
d is 0, 1, 2 or 3, and
e is 0, 1, 2 or 3,
with the proviso that the sum d+e is less than or equal to 3 and in less than 50% of all units of the formula (III) in the organopolysiloxane resin, the sum d+e is 2,
and optionally (B3) organosilicon compounds which are different from (A1) and (A2) and comprise units of the formula $$R^5_g(R^6O)_h SiO_{(4-g-h)/2} \qquad (IV),$$

in which

R⁵ may be identical or different and has a definition stated for R,

R⁶ may be identical or different and has a definition stated for R¹, g is 0, 1, 2 or 3, and h is 0, 1, 2 or 3, with the proviso that the sum g+h is less than or equal to 3 and in at least 50% of all units of the formula (IV) in the organosilicon compound, the sum g+h is 2, optionally (C) polyether-modified siloxanes, optionally (D) organic compounds, optionally (E) water and optionally (F) further additives.

For the present invention it is essential that the components (A1) and (A2) contain aromatic radicals which are bonded directly to the silicon atom. This means that there is a covalent bond between a silicon atom in the unit of the formula (I) and/or (II), and a carbon atom belonging to the aromatic ring. Component (A2) is described for example in WO 2006/018145 A1.

The organosilicon compound (A1) preferably comprises units of the formula (I) in which in 0 to 50%, preferably in 0 to 40%, more preferably in 0% of all units of the formula (I), a is 3.

In one preferred variant, the organosilicon compound (A2) comprises units of the formula (II) in which in 1-15%, preferably in 1-10%, of all units of the formula (II), a' is 3. The defoamer compositions of the invention comprise preferably 10-90 wt %, more preferably 20-80 wt %, and most preferably 25-75 wt % of organosilicon compounds (A1), based in each case on the sum of the organosilicon compounds (A1) and (A2).

Examples of radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radical; cycloalkyl radicals such as cyclopentyl, cyclohexyl, cycloheptyl and methylcyclohexyl radicals, and aromatic groups bonded via aliphatic groups to the silicon atom, such as the benzyl radical, the phenylethyl radical and the 2-phenylpropyl radical.

Examples of substituted radicals R are 3,3,3-trifluoro-n-propyl, cyanoethyl, glycidyloxy-n-propyl, polyalkylene glycol-n-propyl, amino-n-propyl-, aminoethylamino-n-propyl and methacryloyloxy-n-propyl radicals.

The radical R is preferably a hydrogen atom or is a monovalent, optionally substituted aliphatic hydrocarbyl radical having 1 to 30 carbon atoms, more preferably is a monovalent aliphatic hydrocarbyl radical having 1 to 4 carbon atoms, and most preferably is the methyl radical or the n-propyl radical.

Preferably less than 1 mol %, more preferably less than 0.5 mol % of the radicals R in components (A1) and (A2) are hydrogen atoms.

Examples of radical R¹ are the hydrogen atom and the radicals stated for radical R and R².

The radical R¹ is preferably a hydrogen atom or a monovalent, optionally substituted hydrocarbyl radical having 1 to 30 carbon atoms, more preferably a hydrogen atom or a monovalent hydrocarbyl radical having 1 to 4 carbon atoms, more preferably a methyl, ethyl or butyl radical such as the n-butyl radical, for example.

Examples of R² are aryl radicals, such as phenyl, tolyl, xylyl, cumyl, naphthyl, and anthracyl radicals.

Radical R² is preferably the phenyl radical.

Preferably 10 to 100 mol %, more preferably 15 to 100 mol %, and most preferably 20 to 100 mol % of the SiC-bonded radicals in components (A1) and (A2) are radicals R².

In the context of the present invention, the term "organopolysiloxanes" is intended to encompass polymeric, oligomeric, and dimeric siloxanes.

The organosilicon compounds comprising units of the formula (I) that are used as component (A1) are preferably silicone resins which with particular preference consist of units of the formula (I).

Preferred for use as component (A1) are silicone resins which comprise units of the formulae $R^2SiO_{3/2}$ and/or $R^2(R^1O)SiO_{2/2}$ and/or $R^2(R^1O)_2SiO_{1/2}$, more particularly units of the formulae $PhSiO_{3/2}$ and/or $Ph(MeO)SiO_{2/2}$ and/or $Ph(MeO)_2SiO_{1/2}$, where $R^1$ and $R^2$ have the definition indicated for them above, Me is the methyl radical, and Ph is the phenyl radical.

Examples of silicone resins (A1) are those of the formulae

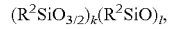

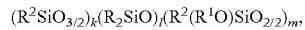

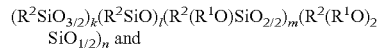

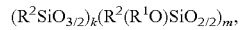

which may additionally comprise units selected from the group of the formulae $R_3SiO_{1/2}$ and $R_2(R^1O)SiO_{1/2}$, and mixtures thereof, preferably in amounts of 0 to 20 mol %, where R, $R^1$ and $R^2$ have the definition indicated for them above, R is preferably a methyl radical or an n-propyl radical, $R^2$ is preferably a hydrogen atom or a methyl radical, and $R^2$ is preferably a phenyl radical, and the coefficients k, l, m and n independently of one another adopt values greater than or equal to 1. The sum of k+l+m+n determines the degree of polymerization and hence the viscosity.

The organosilicon compounds (A1) preferably have a viscosity of preferably at least 10 mPas, more preferably at least 20 mPas, and most preferably at least 30 mPas (measured in each case at 25° C. and a shear rate of 10/s), and preferably at most 500,000 mPas (measured at 25° C. and a shear rate of 1/s), more preferably at most 10,000 mPas, and most preferably at most 1000 mPas (measured in each case at 25° C. and a shear rate of 10/s).

The organosilicon compounds comprising units of the formula (II) that are used as component (A2) are preferably organopolysiloxanes which preferably consist exclusively of units of the formula (II).

The organopolysiloxanes (A2) are preferably largely linear, and use is made in particular of organopolysiloxanes of the formula

    (V)

where the organopolysiloxanes of the formula (V) may contain T units selected from units of the formulae $R^2SiO_{3/2}$, $RSiO_{3/2}$, $R^2(R^1O)SiO_{2/2}$, $R(R^1O)SiO_{2/2}$, $R^2(R^1O)_2SiO_{1/2}$, $R(R^1O)_2SiO_{1/2}$ and mixtures thereof in amounts of 0 to 5 mol %, where R, $R^1$ and $R^2$ have the definition indicated for them above, R* is R or $R^2$, preferably R, p is 0 or 1, v is 0 or an integer, preferably 0 or 1 to 1000, and w is an integer, preferably 1 to 500.

The sum of v+w determines the degree of polymerization and hence the viscosity.

Examples of the component (A2) are those which comprise one or more units of the formulae $Ph_3SiO_{1/2}$, $Ph_2MeSiO_{1/2}$, $PhMe_2SiO_{1/2}$, $Ph_2SiO_{2/2}$, $PhMeSiO_{2/2}$ and $PhSiO_{3/2}$, where Me is methyl radical and Ph is phenyl radical, such as, for example, organopolysiloxanes of the formulae

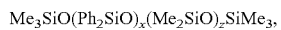
$Me_3SiO(Ph_2SiO)_x(Me_2SiO)_zSiMe_3$,

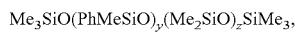
$Me_3SiO(PhMeSiO)_y(Me_2SiO)_zSiMe_3$,

$Me_3SiO(Ph_2SiO)_x(PhMeSiO)_y(Me_2SiO)_zSiMe_3$ and

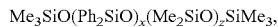
$Me_3SiO(Ph_2SiO)_x(Me_2SiO)_zSiMe_3$, where the organopolysiloxanes may contain units of the formula $PhSiO_{3/2}$ in small amounts, preferably in amounts of 0 to 5 mol %, where the coefficients x and y independently of one another adopt values of greater than or equal to 1, and z is 0 or greater than or equal to 1.

The sum of x+y+z determines the degree of polymerization and hence the viscosity.

The organosilicon compounds (A2) preferably have a viscosity of at least 10 mPas, more preferably at least 100 mPas, and most preferably at least 500 mPas (measured in each case at 25° C. and a shear rate of 10/s), and preferably at most 1,000,000 mPas, more preferably not more than 50,000 mPas, and most preferably not more than 5000 mPas (measured in each case at 25° C. and a shear rate of 10/s).

The organosilicon compounds (A1) and (A2) are commercially customary products and/or can be prepared by any desired methods known to date in organosilicon chemistry, such as, for example, by cohydrolysis of the corresponding silanes.

The defoamer compositions of the invention contain preferably 30-95 wt %, more preferably 30-90 wt %, of organosilicon compounds (A1) and (A2).

The compositions of the invention preferably comprise adjuvants (B) in amounts of 0.1 to 30 parts by weight, more preferably 1 to 15 parts by weight, based in each case on 100 parts by weight of the sum of components (A1) and (A2).

Adjuvant (B) used in accordance with the invention may comprise—aside from the component (B3) present optionally—exclusively component (B1), exclusively component (B2), or a mixture of components (B1) and (B2), the latter being preferred.

Component (B1) preferably comprises pulverulent, especially hydrophobic, fillers.

The compositions of the invention preferably contain adjuvant (B1) in amounts of 0.1 to 30 parts by weight, more preferably 1 to 15 parts by weight, and most preferably 2 to 10 parts by weight, based in each case on 100 parts by weight of the sum of components (A1) and (A2).

Component (B1) preferably has a BET surface area of 20 to 1000 m$^2$/g, a particle size of less than 10 μm, and an agglomerate size of less than 100 μm.

Examples of component (B1) are silicon dioxide (silicas), titanium dioxide, aluminum oxide, metal soaps, finely ground quartz, PTFE powders, fatty acid amides, e.g., ethylenebisstearamide, and finely divided hydrophobic polyurethanes.

Preferred for use as component (B1) are silicon dioxide (silicas), titanium dioxide or aluminum oxide, preferably with a BET surface area of 20 to 1000 m$^2$/g, more particularly with a particle size of less than 10 μm and an agglomerate size of less than 100 μm.

Particularly preferred as component (B1) are silicas, more preferably those having a BET surface area of 50 to 800 m$^2$/g, and most preferably those having a BET surface area of 80 to 500 m$^2$/g. These silicas may be fumed or precipitated silicas. As component (B1) it is possible to use not only pretreated silicas, in other words commercial hydrophobic silicas, but also hydrophilic silicas.

The degree of hydrophobizing is characterized by the methanol number. This number is determined in accordance with DE 2107082 A1 by placing 0.2 g of the silica into 50 ml of water. Methanol is added with stirring until the silica is completely wetted and suspended in the liquid. The methanol number is the percentage of methanol in the liquid mixture that just wets the silica. Pretreated hydrophobic silicas used are preferably silicas having a methanol number of more than 30, more particularly more than 50.

Examples of commercial hydrophobic silicas which can be used in accordance with the invention are HDK® H2000, a fumed silica treated with hexamethyldisilazane having a BET surface area of 140 m$^2$/g (available commercially from Wacker-Chemie AG, Munich, Germany), and a precipitated silica treated with polydimethylsiloxane having a BET surface area of 90 m$^2$/g (available commercially under the name "Sipernat D10" from Evonik Resource Efficiency GmbH, Hanau, Germany).

If hydrophobic silicas are to be used as component (B1), hydrophilic silicas may also be hydrophobized in situ, if this is advantageous for the desired activity of the defoamer formulation. There are many known methods for hydrophobizing silicas. The hydrophobizing of the hydrophilic silica in situ may be accomplished, for example, by heating the silica, dispersed in component (A1) and/or (A2) or in a mixture (A1) and/or (A2) with (B2) and/or (C), at temperatures of 100 to 200° C. for a number of hours. In that case the reaction may be assisted by the addition of catalysts, such as KOH, and of hydrophobizing agents, such as short-chain, OH-terminated polydimethylsiloxanes, silanes or silazanes. This treatment is also possible when using commercial hydrophobic silicas and may contribute to an improvement in activity.

Another way is to use a combination of silicas hydrophobized in situ with commercial hydrophobic silicas. In that case, it is preferred if 0.2 to 5 parts of pretreated hydrophobized silica are used per part of silica hydrophobized in situ.

The compositions of the invention preferably comprise adjuvant (B2) in amounts of 0.1 to 30 parts by weight, more preferably 1 to 15 parts by weight, and most preferably 2 to 10 parts by weight, based in each case on 100 parts by weight of the sum of components (A1) and (A2).

The component (B2) optionally used in accordance with the invention preferably comprises silicone resins composed of units of the formula (III) in which the sum d+e in the resin is 2 in less than 30%, preferably in less than 5%, of the units.

With particular preference, component (B2) comprises organopolysiloxane resins which consist essentially of $R^3_3SiO_{1/2}$ (M) and $SiO_{4/2}$ (Q) units where $R^3$ has the definition stated above, these resins also being referred to as MQ resins. The molar ratio of M to Q units is preferably in the range from 0.5 to 2.0, more preferably in the range from 0.6 to 1.0. These silicone resins may further comprise up to 10 wt % of free hydroxyl or alkoxy groups ($OR^4$). Examples of radical $R^3$ are the hydrogen atom and the radicals indicated for radical R and $R^2$.

The radical $R^3$ preferably comprises a monovalent, optionally substituted hydrocarbyl radical having 1 to 30 carbon atoms, more preferably a monovalent hydrocarbyl radical having 1 to 6 carbon atoms, and most preferably the methyl radical.

Examples of radical $R^4$ are the radicals indicated for the radical $R^1$.

The radical $R^4$ preferably comprises a hydrogen atom or a monovalent hydrocarbyl radical having 1 to 4 carbon atoms, more preferably a hydrogen atom or the methyl or ethyl radical.

The value of d is preferably 3 or 0.

The organopolysiloxane resins (B2) preferably have a viscosity of greater than 1000 mPas (measured at 25° C. and a shear rate of 10/s) or are solids. The weight-average molecular weight (based on a polystyrene standard) that is determined by gel permeation chromatography for these resins is preferably 200 to 200,000 g/mol, more particularly 1000 to 20,000 g/mol.

The organopolysiloxane resins (B2) used in accordance with the invention are preferably soluble to an extent of at least 100 g/l in benzene at a temperature 25° C. under a pressure of 101.325 kPa.

Component (B2) are commercial products and/or can be prepared by methods common in silicon chemistry, as for example in accordance with EP-A 927 733.

If the adjuvant (B) used in accordance with the invention comprises a mixture of components (B1) and (B2), the weight ratio of (B1) to (B2) in the mixture is preferably 0.01 to 50, more preferably 0.1 to 7.

The adjuvant (B3) used optionally in accordance with the invention is preferably an organosilicon compound which is used in amounts of 1 to 900 parts by weight, more preferably 2 to 100 parts by weight, and most preferably 2 to 10 parts by weight, based in each case on 100 parts by weight of the sum of components (A1) and (A2).

Examples of radicals $R^5$ are the examples indicated for radical R.

The radical $R^5$ is preferably a hydrogen atom or a monovalent, optionally substituted, aliphatic hydrocarbyl radical having 1 to 30 carbon atoms, more preferably a monovalent, aliphatic hydrocarbyl radical having 1 to 4 carbon atoms, and most preferably the methyl radical.

Examples of radical $R^6$ are the hydrogen atom and the radicals indicated for radical R and $R^2$.

The radical $R^6$ is preferably a hydrogen atom or a monovalent, optionally substituted hydrocarbyl radical having 1 to 30 carbon atoms, more preferably a hydrogen atom or a monovalent hydrocarbyl radical having 1 to 4 carbon atoms, and most preferably the methyl or ethyl radical.

The value of g is preferably 1, 2 or 3.

The value of h is preferably 0 or 1.

The organosilicon compounds (B3) used optionally are preferably organopolysiloxanes consisting of units of the formula (IV). The organosilicon compounds (B3) preferably have a viscosity of at least 10 mPas (measured at 25° C. and a shear rate of 10/s) and preferably at most 1,000,000 $mm^2$/s (measured at 25° C. and a shear rate of 0.1/s).

Examples of organopolysiloxanes (B3) are those which are different from the organopolysiloxanes (A1) and (A2) and contain no aromatic radicals bonded directly to silicon, such as, for instance, polydimethylsiloxanes having viscosities of 100 to 1,000,000 mPa·s at 25° C. These polydimethylsiloxanes may be branched, for example, through the incorporation of $R^5SiO_{3/2}$ or $SiO_{4/2}$ units up to a maximum of 5% of all units, with $R^5$ having the definition indicated for it above. In that case these branched or partially crosslinked siloxanes have viscoelastic properties.

The component (B3) preferably comprises essentially linear organopolysiloxanes comprising units of the formula (IV), more preferably polydimethylsiloxanes which may be terminated by silanol groups and/or by alkoxy groups and/or by trimethylsiloxy groups.

As component (B3) it is also possible to use organosilicon compounds containing building blocks of the general formula (IV) in which $R^5$ is a methyl radical and $R^6$ is a linear and/or branched hydrocarbyl radical having at least 6 carbon atoms, h adopts an average value of 0.005 to 0.5, and the sum (g+h) has an average value of 1.9 to 2.1. Products of this kind are available, for example, by alkali-catalyzed condensation of silanol-terminated polydimethylsiloxanes having a viscosity of 50 to 50,000 mPa·s (measured in each case at 25° C. and a shear rate of 10/s) and aliphatic alcohols having more than 6 carbon atoms, such as isotridecyl alcohol, n-octanol, stearyl alcohol, 4-ethylhexadecanol or eicosanol.

Components (B3) are commercial products or can be prepared by methods common in silicon chemistry.

As optionally used polyether-modified siloxanes (C), preference is given to using polyether-polysiloxane copolymers, which may be linear or branched polymers. Polyether-polysiloxane copolymers of these kinds are prior art and are known to the skilled person.

Examples of linear polyether-polysiloxane copolymers are those in which the polyether radicals are pendently SiC-bonded to linear siloxane chains via hydrocarbyl radicals, preferably divalent hydrocarbyl radicals.

Linear polyether-polysiloxane copolymers of this kind are described for example in GB 2 350 117 A.

Examples of branched polyether-polysiloxane copolymers are those in which the polyether radicals are SiC-bonded pendently to linear siloxane chains via hydrocarbyl radicals, preferably divalent hydrocarbyl radicals, and where these linear siloxane chains are connected to one another via pendent organic bridges.

Examples of these organic bridges are SiC-bonded, linear or branched organic radicals, preferably divalent hydrocarbyl radicals, which may contain one or more heteroatoms selected from the group of oxygen atoms and nitrogen atoms, such as alkylene radicals, SiC-bonded polyether radicals bonded to the siloxane chains via alkylene radicals, and SiC-bonded divalent hydrocarbyl radicals, such as alkylene radicals, which contain polyether groups and urethane groups.

Especially suitable are branched polyether-polysiloxane copolymers, of the kind described as a component of defoamers in, for example, EP 1 076 073 A1, EP 1 424 117 A2 or WO 2006/128624 A1 (incorporated by reference).

Employed as branched polyether-polysiloxane copolymers are preferably those in which the siloxane chains are connected to one another via pendent, divalent, SiC-bonded hydrocarbyl radicals which contain polyether radicals and urethane groups.

These polyether-polysiloxane copolymers and their preparation are described in WO 2006/128624 A1, particularly at page 3, line 8 to page 13, line 38 (incorporated by reference).

In the defoamer compositions of the invention, the polyether-polysiloxane copolymers (C) are preferably used in amounts of 0 to 60 wt %, more preferably 0 to 40 wt %, and most preferably 0 to 10 wt %, based in each case on the total weight of the defoamer composition.

Besides components (A), (B) and optionally (C), the defoamer formulations of the invention may comprise all further substances of the kind already used previously in defoamer formulations, such as, for example, organic compounds (D), especially water-insoluble organic compounds (D).

The term "water-insoluble" is intended for the purposes of the present invention to refer to a solubility in water at 25° C. under a pressure of 1013.25 hPa of not more than 2 percent by weight.

The optionally employed component (D) comprises, with particular preference, organic compounds having a boiling point of greater than 100° C. under the pressure of the surrounding atmosphere, in other words at 900 to 1100 hPa, and more preferably compounds which cannot be distilled without decomposition, especially compounds selected from mineral oils, natural oils, isoparaffins, polyisobutylenes, residues from the oxo synthesis of alcohols, esters of low molecular mass synthetic carboxylic acids such as 2,2,4-trimethyl-3,3-pentanediol diisobutyrates, fatty acid esters such as octyl stearate and dodecyl palmitate, fatty alcohols, ethers of low molecular mass alcohols, phthalates, glycols such as 1,2-propanediol, glycol ethers, polyethylene glycols, polyethylene glycol ethers and/or polypropylene glycol ethers of linear or branched alcohols having 3-30 carbon atoms, polyethylene glycol esters and/or polypropylene glycol esters of carboxylic acids having 3-30 carbon atoms, esters of phosphoric acid, and waxes.

In the defoamer compositions of the invention, the organic compounds (D) are preferably used in amounts of 0 to 60 wt %, more preferably 0 to 20 wt %, and most preferably 3 to 20 wt %, based in each case on the total weight of the defoamer compositions.

The compositions of the invention may comprise water (E). Examples of water (E) are natural waters, such as rainwater, groundwater, spring water, river water and seawater, chemical waters, such as fully demineralized water, distilled or (multiply) redistilled water, waters for medical or pharmaceutical use, such as purified water (aqua purificata; Pharm. Eur. 3), aqua deionisata, aqua destillata, aqua bidestillata, aqua ad injectionam or aqua conservata, drinking water according to the German drinking water ordinance, and mineral waters.

In the defoamer compositions of the invention, water (E) is preferably used in amounts of 0 to 90 wt %, more preferably 0 to 10 wt %, yet more preferably 0 to 5 wt %, and most preferably 0 to 1 wt %, based in each case on the total weight of the defoamer compositions.

The defoamer compositions of the invention preferably contain no water (E); in other words, the use of water is preferably ruled out.

As additives (F) it is possible to use all known additives such as organic thickening polymers, preservatives, dyes and fragrances. It is also possible to make accompanying use of alkaline or acidic catalysts.

Examples of alkaline catalysts are alkali metal and alkaline earth metal hydroxides, such as NaOH, KOH, CsOH, LiOH and $Ca(OH)_2$. Examples of acidic catalysts are hydrochloric acid, sulfuric acid, and phosphoronitride chlorides.

The catalysts may be added in typical organic solvents such as alcohols (such as methanol, ethanol, isopropanol), in esters (such as ethyl acetate), in water or else in organopolysiloxanes (B3).

The defoamer compositions of the invention preferably comprise
10 to 60 wt % of organosilicon compounds (A1),
20 to 70 wt % of organosilicon compounds (A2),
2 to 15 wt % of adjuvants (B1),
2 to 15 wt % of adjuvants (B2),
0 to 15 wt % of adjuvants (B3),
0 to 10 wt % of polyether-modified siloxanes (C),
0 to 20 wt %, preferably 3 to 20 wt %, of organic compounds (D),
0 to 1 wt % of water (E), and
0 to 10 wt % of further additives (F),
based in each case on the total weight of the defoamer compositions, and more preferably consist only of these ingredients.

The defoamer compositions of the invention are preferably viscous, are clear to opaque, and are also colorless to brownish, liquids.

The defoamer compositions of the invention preferably have a viscosity of 1 to 20,000 mPas, more preferably 5 to 5000 mPas, in each case at 25° C. and a shear rate of 50/s.

The defoamer compositions of the invention may be solutions or dispersions or powders.

The defoamer compositions of the invention may be produced by known methods, such as by the mixing of all the components, by means, for example, of simple stirring with static mixers or else using high shearing forces in colloid mills, dissolvers and rotor-stator homogenizers. This mixing operation may take place under reduced pressure, in order to prevent the incorporation of air which is present, for example, in finely divided fillers. Subsequently, as and when necessary, the fillers may be hydrophobized in situ.

The defoamer compositions of the invention may also be used as emulsions comprising
defoamer compositions of the invention,
emulsifiers, and
water,
with aqueous emulsions not being preferred.

If the defoamer compositions of the invention are present in emulsions, it is possible to use any emulsifiers known to the skilled person for the purpose of producing silicone emulsions, such as, for example, anionic, cationic or nonionic emulsifiers. Preferred for use are emulsifier mixtures, in which there is at least one nonionic emulsifier included, such as a sorbitan fatty acid ester, ethoxylated sorbitan fatty acid ester, ethoxylated fatty acid, ethoxylated linear or branched alcohol having 10 to 20 carbon atoms, and/or glycerol ester. Anionic emulsifiers which can be used are typical anionic emulsifiers such as carboxylates, sulfates or sulfonates, preferably sulfates or sulfonates such as salts of α-sulfo fatty acid alkyl esters, fatty alcohol sulfates such as sodium lauryl sulfate, alkanesulfonates, especially secondary alkanesulfonates, alkylbenzenesulfonates such as sodium dodecylbenzenesulfonate, or mixtures thereof. Also possible is the addition of compounds known as thickeners, such as polyacrylic acid, polyacrylates, cellulose ethers such as carboxymethylcellulose and hydroxyethylcellulose, polyurethanes, natural thickeners such as xanthan gum, and also preservatives and other customary additives known to one skilled in the art.

If the defoamer compositions of the invention are used in the form of emulsions, the continuous phase is preferably water. It is, however, also possible to produce defoamer compositions of the invention in the form of emulsions wherein the continuous phase is formed by components (A1) and (A2) and (B1) and (B2) and optionally (B3) and optionally (C) and optionally (F), or by component (D). These emulsions may also be multiple emulsions.

Methods for producing silicone emulsions are known. Production is accomplished typically by simply stirring together all of the constituents and, optionally, subsequently carrying out homogenization using jet dispersers, rotor-stator homogenizers, colloid mills or high-pressure homogenizers.

If the composition of the invention comprises emulsions, preference is given to oil-in-water emulsions comprising 5 to 50 wt % of defoamer compositions of the invention comprising components (A1), (A2), (B1), (B2), optionally (B3) optionally (C), optionally (D), optionally (E), and optionally (F), 1 to 20 wt % of emulsifiers and optional thickeners, and 30 to 90 wt % of water.

The compositions of the invention can also be formulated as free-flowing powders. These powders are preferred in the context, for example, of application in powder laundry detergents. The production of these powders, starting from the defoamer compositions of the invention comprising components (A1), (A2), (B1), (B2), optionally (B3), optionally (C) optionally (D), optionally (E), and optionally (F), takes place according to methods known to the skilled person, such as spray drying or agglomerative granulation, using additives known to the skilled person.

The invention therefore provides powders comprising defoamer compositions of the invention and carrier materials.

The powders of the invention preferably comprise 2 to 20 weight percent of the defoamer compositions of the invention comprising the components (A1), (A2), (B1), (B2), optionally (B3), optionally (C), optionally (D), optionally (E), and optionally (F).

Examples of carrier materials employed are zeolites, sodium sulfate, sodium bicarbonate, sodium carbonate, cellulose derivatives, urea and its derivatives, and sugars. The powders of the invention contain 80 to 98 wt % of carrier materials. Further possible constituents of the powers of the invention are, for example, waxes or organic polymers, as described for example in EP-A 887097 and EP-A 1060778.

A further subject of the present invention are surfactant formulations, preferably laundry detergents and cleaning products, more preferably liquid laundry detergents, comprising the defoamer compositions of the invention, or the defoamer compositions of the invention in the form of emulsions or in the form of powders.

The defoamer compositions of the invention can be employed wherever defoamer compositions based on organosilicon compounds have also been employed to date.

A further subject of the present invention is a method for the defoaming of and/or for the prevention of the foaming of media, that involves mixing the defoamer compositions of the invention or emulsions or powders thereof with the media.

The addition of the defoamer compositions of the invention to the foaming medium may take place directly, in solution in suitable solvents, such as toluene, xylene, methyl ethyl ketone or tert-butanol, in the form of powder or in the form of an emulsion. The amount needed to achieve the desired defoamer effect is guided, for example, by the nature of the medium, the temperature, and the turbulence that occurs.

The defoamer compositions of the invention are added preferably in amounts of 0.1 ppm by weight to 1 wt %, more particularly in amounts of 1 to 100 ppm by weight, to the foaming medium in its application-ready form. In concentrated surfactant formulations such as liquid laundry detergents, the compositions of the invention may be present at 0.1 to 20 wt %, more preferably at 0.5 to 5 wt %.

The method of the invention is preferably carried out at temperatures of-10 to +150° C., more preferably 5 to 100° C., under the pressure of the surrounding atmosphere, in other words approximately 900 to 1100 hPa. The method of the invention may also be carried out at higher or lower pressures, such as, for instance, at 3000 to 4000 hPa or 1 to 10 hPa.

The defoamer compositions of the invention can be used wherever, and the method of the invention can be carried out wherever, disruptive foam is to be prevented or destroyed. This is the case, for example, in nonaqueous media, such as in tar distillation or in petroleum processing, and also in aqueous media. The defoamer compositions of the invention are, and the method of the invention is, especially suitable for controlling foam in aqueous media, such as, for example, in aqueous surfactant formulations, such as application in laundry detergents and cleaning products, the control of foam in wastewater systems, in textile dying processes, in the scrubbing of natural gas, in polymer dispersions, or for defoaming aqueous media that arise in the production of pulp.

The defoamer compositions of the invention are especially suitable as a constituent of liquid laundry detergents, where they are distinguished by outstanding compatibility and activity.

Advantages of the compositions of the invention are that as defoamers they are easily handled, they can be mixed with concentrated surfactant formulations, and they are distinguished by high and long-lasting activity in a wide variety of different media when added in small quantities. This is extremely advantageous from the standpoints both of economics and of the environment.

The method of the invention has the advantage that it is simple to carry out and highly economical.

The viscosity of the individual components, especially components (A1) and (A2), is determined according to DIN 53019-(2008-09) (Principles and measurement geometry), DIN 53019-2 (2001-2) (Viscometer calibration and determination of measurement uncertainty) and DIN 53019-3 (2008-09) (Measurement deviations and corrections) and/or according to DIN EN ISO 3219 (1994) (Plastics—Polymers/resins in the liquid state or as emulsions or dispersions—Determination of viscosity using a rotational viscometer with defined shear rate) using a cone/plate viscometer MCR 300 (Paar-Physika) at 25° C. and a shear rate as indicated accordingly. The viscosity of the defoamer compositions is determined according to DIN EN ISO 3219 using a cone-plate viscometer MCR 300 (Paar-Physika) at 25° C. and a shear rate of 50/s.

In the examples below, all figures for parts and percentages, unless otherwise indicated, are based on weight. Unless otherwise indicated, the following examples are carried out under the pressure of the surrounding atmosphere, in other words at approximately 1000 hPa, and at room temperature, in other words approximately 20° C., or at a temperature which comes about when the reactants are combined at room temperature without additional heating or cooling.

In the text below, the structures of the phenylsiloxanes used are determined by $^{29}Si$ NMR data in mol %.

In the text below, the abbreviations Me for the methyl radical and Ph for the phenyl radical are used.

(Comparative) Defoamer Formulation F1

88 parts of a silicone oil (component (A2)) having a viscosity of 1000 mPas (measured at 25° C. and a shear rate of 10/s), and consisting according to $^{29}$Si NMR of the following units:

Me$_3$SiO$_{(1/2)}$ 2.9%
Me$_2$SiO$_{(2/2)}$ 34.7%
Me$_2$Si(OH)O$_{(1/2)}$ 0.4%
PhSi(Me)O$_{(2/2)}$ 61.0%
PhSiO$_{(3/2)}$ 1.0%

(available under the name Siliconol AP 1000 from Wacker Chemie AG, Munich), 5 parts of a fumed silica having a BET surface area of 300 m$^2$/g (available under the name HDK® T30 from Wacker Chemie AG, Munich), 5 parts of a hydrocarbon mixture having a boiling range of 235-270° C. (available commercially under the designation Exxsol D 100 S from Staub & Co, Nuremberg, Germany), 5 parts of a silicone resin which is solid at room temperature and consists of the following units (according to $^{29}$Si NMR and IR analysis): 40 mol % CH$_3$SiO$_{1/2}$—, 50 mol % SiO$_{4/2}$—, 8 mol % C$_2$H$_5$OSiO$_{3/2}$— and 2 mol % HOSiO$_{3/2}$—, this resin having a weight-average molar mass of 7900 g/mol (based on polystyrene standard), and 0.7 part of a 20 wt % strength methanolic KOH were mixed with a dissolver and heated at 150° C. for 4 hours. This gave a defoamer formulation having a viscosity of 3000 mPas.

(Comparative) Defoamer Formulation F2

88 parts of a liquid silicone resin (component (A1)) having a viscosity of 140 mPas (measured at 25° C. and a shear rate of 10/s), and consisting according to $^{29}$Si NMR of the following units:

Me$_2$SiO$_{(2/2)}$ 33.0%
Me$_2$Si(OR)O$_{(1/2)}$ 4.5%
Ph(OR)SiO$_{(2/2)}$ 28.8%
Ph(OR)$_2$SiO$_{(1/2)}$ 11.5%
PhSiO$_{(3/2)}$ 22.2% where R is a mixture of methyl and n-butyl radicals, (available under the name SILRES® SY 231 from Wacker Chemie AG, Munich), 5 parts of a fumed silica having a BET surface area of 300 m$^2$/g (available under the name HDK® T30 from Wacker Chemie AG, Munich), 5 parts of a hydrocarbon mixture having a boiling range of 235-270° C. (available commercially under the designation Exxsol D 100 S from Staub & Co, Nuremberg, Germany), 5 parts of a silicone resin which is solid at room temperature and consists of the following units (according to $^{29}$Si NMR and IR analysis): 40 mol % CH$_3$SiO$_{1/2}$—, 50 mol % SiO$_{4/2}$—, 8 mol % C$_2$H$_5$OSiO$_{3/2}$— and 2 mol % HOSiO$_{3/2}$—, this resin having a weight-average molar mass of 7900 g/mol (based on polystyrene standard), and 0.7 part of a 20 wt % strength methanolic KOH were mixed with a dissolver and heated at 150° C. for 4 hours.

(Inventive) Defoamer Formulation F3

42.5 parts of a silicone oil AP 1000 (component (A2)) from example F1, 42.5 parts of a liquid silicone resin (component (A1)) from example F2, 5 parts of a fumed silica having a BET surface area of 300 m$^2$/g (available under the name HDK® T30 from Wacker Chemie AG, Munich), 5 parts of a hydrocarbon mixture having a boiling range of 235-270° C. (available commercially under the designation Exxsol D 100 S from Staub & Co, Nuremberg, Germany), 5 parts of a silicone resin which is solid at room temperature and consists of the following units (according to $^{29}$Si NMR and IR analysis): 40 mol % CH$_3$SiO$_{1/2}$—, 50 mol % SiO$_{4/2}$—, 8 mol % C$_2$H$_5$OSiO$_{3/2}$— and 2 mol % HO SiO$_{3/2}$—, this resin having a weight-average molar mass of 7900 g/mol (based on polystyrene standard), and 0.7 part of a 20 wt % strength methanolic KOH were mixed with a dissolver and heated at 150° C. for 4 hours. This gave a defoamer formulation having a viscosity of 1980 mPas.

Measuring System for Testing the Defoamer Activity 500 ml of fully demineralized water are admixed with 1.00 g of the corresponding laundry detergent formulation W1 or W2 and the mixture is placed into a 1 liter volumetric cylinder. With the aid of a thermostat, the mixture is conditioned to 25° C. Following addition of 0.1 ml of a 10 wt % formulation of the respective defoamer formulation (F1) to (F3) in ethyl methyl ketone, the detergent solution together with the defoamer formulation is pumped in circulation with a pumping performance of 150 liters/hour. A measurement is made of the time t between the start of the test and the point at which the foam had risen to 90 mm. The average value from three measurements is reported in each case.

Production of Laundry Detergent Formulation W1:

To 65.09 g of fully demineralized water are added 10.90 g of an alkoxylated fatty alcohol (available under the name Lutensol® TO 8 from BASF SE) with vigorous stirring. 8.70 g of sodium dodecylbenzenesulfonate (available as the technical product from Aldrich) and 7.70 g of sodium dodecyl sulfate (available as 90% product from Aldrich) were added, followed by brief stirring together. 5.61 g of 1,2-propanediol (available from Merck) are mixed in. Lastly, 1.00 g of sodium citrate tribasic dihydrate (available from Aldrich) are incorporated with stirring until all the ingredients are in solution.

Production of Laundry Detergent Formulation W2:

To 65.09 g of fully demineralized water are added 6.50 g of an alkoxylated fatty alcohol (available under the name Lutensol® TO 8 from BASF SE) with vigorous stirring. 10.90 g of sodium dodecylbenzenesulfonate (available as the technical product from Aldrich) and 10.90 g of sodium dodecyl sulfate (available as 90% product from Aldrich) were added, followed by brief stirring together. 5.61 g of 1,2-propanediol (available from Merck) are mixed in. Lastly, 1.00 g of sodium citrate tribasic dihydrate (available from Aldrich) are incorporated with stirring until all the ingredients are in solution.

Defoamer Activity

TABLE 1

| Use of laundry detergent formulation W1: | |
|---|---|
| Comparative experiments and example | Time t in seconds |
| (Comparative) defoamer formulation F1 | 330 |
| (Comparative) defoamer formulation F2 | 260 |
| (Inventive) defoamer formulation F3 | 435 |

TABLE 2

| Use of laundry detergent formulation W2 (higher fraction of anionic surfactant): | |
|---|---|
| Comparative experiments and example | Time t in seconds |
| (Comparative) defoamer formulation F1 | 247 |
| (Comparative) defoamer formulation F2 | 230 |

TABLE 2-continued

Use of laundry detergent formulation W2 (higher fraction of anionic surfactant):

| Comparative experiments and example | Time t in seconds |
|---|---|
| (Inventive) defoamer formulation F3 | 296 |

In both laundry detergent formulations, by means of the defoamer formulation in which phenyl oil (component (A2)) and phenyl resin (component (A1)) are used together, relative to the defoamer formulations in which the phenyl oil or the phenyl resin are used alone, it is possible to achieve an increase in the defoamer effect and more particularly the period of action.

(Inventive) Powder Defoamer Formulation F4

In a glass beaker, 30.0 g of light sodium carbonate, 172.5 g of sodium sulfate, 22.5 g of a natural cellulose such as Arbocel UFC M8 (available commercially from Rettenmaier & Söhne) and 30.0 g of sodium citrate are introduced and are mixed thoroughly with one another using a paddle stirrer. 45.2 g of the defoamer formulation F3 are added slowly with thorough stirring. This gave a white, pourable powder.

Tests of Defoamer Activity in Washing Machine

A defined amount (see table 3) of defoamer formulation was added to 130 g of an ECE-2 laundry powder from WFK. The laundry powder was then placed together with 3500 g of clean cotton laundry into a drum washing machine (Miele Novotronik W918 without Fuzzy Logic). The wash program is then commenced; the program runs at a temperature of 40° C. and a water hardness of 3° GHab. The foam height is recorded over a period of 55 minutes. From the foam scores obtained over the entire period (0%, no foam measurable, up to 100%, overfoaming), the average foam score is determined. The lower this score, the more effective the defoamer formulation over the whole of the period.

Defoamer Activity

TABLE 3

Defoamer effect of 0.05 g of defoamer formulation per 100 g of laundry powder in a washing machine:

| Defoamer formulation | Average foam score |
|---|---|
| F4 | 13% |

Defoamer formulation F4 exhibits an excellent antifoam effect over the whole of the washing period.

(Inventive) Defoamer Formulation F5

Defoamer formulation F5 was produced in the same way as for F3, but using a ratio of 60 parts of Silicon oil AP 1000 (component (A2)) from example F1 and 25 parts of silicone resin SILRES® SY 231 (component (A1)) from example F2.

(Inventive) Defoamer Formulation F6

42.0 parts of a silicone oil AP 1000 (component (A2)) from example F1, 42.0 parts of a liquid silicone resin (component (A1)) from example F2, 2.0 parts of a fumed silica having a BET surface area of 300 m²/g (available under the name HDK® T30 from Wacker Chemie AG, Munich), 4.0 parts of a fumed silica treated with hexamethyldisilazanes and having a BET surface area of 140 m²/g (available commercially from Wacker-Chemie AG, Munich, Germany under the designation HDK® H2000), 5.0 parts of a hydrocarbon mixture having a boiling range of 235-270° C. (available commercially under the designation Exxsol D 100 S from Staub & Co, Nuremberg, Germany), 5 parts of a silicone resin which is solid at room temperature and consists of the following units (according to $^{29}$Si NMR and IR analysis): 40 mol % $CH_3SiO_{1/2}$—, 50 mol % $SiO_{4/2}$—, 8 mol % $C_2H_5OSiO_{3/2}$— and 2 mol % $HOSiO_{3/2}$—, this resin having a weight-average molar mass of 7900 g/mol (based on polystyrene standard), and 0.7 part of a 20 wt % strength methanolic KOH were mixed with a dissolver and heated at 150° C. for 4 hours.

Production of Laundry Detergent Formulation W3:

168.40 g of an alkoxylated fatty alcohol (available under the name Lutensol® AO 8 from BASF SE) were melted at 50° C. 30.88 g of lauric acid and 7.02 g of potassium hydroxide were added and the ingredients were briefly stirred together, after which 462.52 g of fully demineralized water with a temperature of 50° C. were added and the components were mixed. When all of the ingredients were homogeneously in solution, 190.85 g of an Na C14-17 alkylsulfonate (available under the name Hostapur SAS 60 from Clariant International Ltd.), 28.07 g of sodium tetraborate and 56.13 g of sodium citrate were incorporated with stirring until all of the ingredients were in solution. To conclude, 56.13 g of 1,2-propanediol were mixed in as well.

Tests of Defoamer Activity in the Washing Machine 100 g of the laundry detergent formulation W3 containing the defoamer formulation were placed into the above drum washing machine, a wash program was started as described, and the development of foam was recorded as described. Defoamer formulations F5 and F6 are each added in the form of 10% formulations in ethylhexyl stearate (available under the name Tegosoft OS from Evonik).

Defoamer Activity

TABLE 4

Defoamer effect of 0.025 g of defoamer formulation per 100 g of laundry detergent formulation W3 in a washing machine:

| Defoamer formulation | Average foam score |
|---|---|
| F5 | 3% |
| F6 | 9% |

Even at a very low level of addition, the defoamer formulations F5 and F6 of the invention exhibit excellent defoamer action in liquid surfactant systems.

The invention claimed is:

1. A defoamer composition, comprising:
   (A1) at least one organosilicon compound comprising units of the formula $$R_a(R^1O)_bR^2{}_cSiO_{(4-a-b-c)/2} \qquad (I),$$

in which
   R are identical or different and are a hydrogen atom or a monovalent, SiC-bonded, optionally substituted hydrocarbyl radical which is aliphatic or which is aromatic and is bonded via an aliphatic carbon atom to silicon,
   $R^1$ are identical or different and are hydrogen or a monovalent, optionally substituted hydrocarbyl radical,
   $R^2$ are identical or different and are monovalent, optionally substituted, aromatic hydrocarbyl radicals bonded via a ring carbon atom to silicon,
   a is 0, 1, 2 or 3,
   b is 0, 1, 2 or 3, and
   c is 0 or 1, with the proviso that
the sum a+b+c is less than or equal to 3,
in at most 70% of all units of the formula (I), the sum a+c is 2,
in at least 30% of all units of the formula (I), the sum a+c is 1, and
in more than 20% of all units, c is 1,
(A2) organosilicon compounds comprising units of the formula

  (II), in which
R, $R^1$ and $R^2$ have the definition stated for them above,
a' is 0, 1, 2 or 3,
b' is 0, 1, 2 or 3, and
c' is 0, 1, 2 or 3,
with the proviso that
the sum a'+b'+c' is less than or equal to 3,
in more than 90% of all units of the formula (II) the sum a'+c' is 2,
in at most 5% of all units of the formula (II) the sum a'+c' is 1, and
in 10-85% of all units of the formula (II) c' is other than 0,
(B1) filler particles and/or
(B2) organopolysiloxane resins containing units of the formula

  (III), in which
$R^3$ are identical or different and are hydrogen or a monovalent, optionally substituted, SiC-bonded hydrocarbyl radical,
$R^4$ are identical or different and are hydrogen or a monovalent, optionally substituted hydrocarbyl radical,
d is 0, 1, 2 or 3, and
e is 0, 1, 2 or 3,
with the proviso that the sum d+e is less than or equal to 3 and in less than 50% of all units of the formula (III) in the organopolysiloxane resin, the sum d+e is 2,
and optionally
(B3) organosilicon compounds which are different from (A1) and (A2) and comprise units of the formula

  (IV), in which
$R^5$ are identical or different and have a definition stated for R,
$R^6$ are identical or different and have a definition stated for $R^1$,
g is 0, 1, 2 or 3, and
h is 0, 1, 2 or 3,
with the proviso that the sum g+h is less than or equal to 3 and in at least 50% of all units of the formula (IV) in the organosilicon compound, the sum g+h is 2,
(C) optionally, polyether-modified siloxanes,
(D) optionally, organic compounds,
(E) optionally, water, and
(F) optionally, further additives.

2. The defoamer composition of claim 1, wherein R is a monovalent aliphatic hydrocarbyl radical having 1 to 4 carbon atoms, and
$R^1$ is hydrogen or a monovalent hydrocarbyl radical having 1 to 4 carbon atoms.

3. The defoamer composition of claim 1, wherein R is methyl or n-propyl, and
$R^1$ is hydrogen or methyl.

4. The defoamer composition of claim 1, wherein $R^2$ is an aryl radical.

5. The defoamer composition of claim 1, wherein $R^2$ is a phenyl radical.

6. The defoamer composition of claim 1, wherein 10 to 100 mol % of the SiC-bonded radicals in components (A1) and (A2) are radicals $R^2$.

7. A defoamer composition comprising:
(A1) at least one organosilicon compound comprising units of the formula

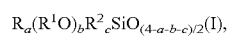  (I), in which
R are identical or different and are a hydrogen atom or a monovalent, SiC-bonded, optionally substituted hydrocarbyl radical which is aliphatic or which is aromatic and is bonded via an aliphatic carbon atom to silicon,
$R^1$ are identical or different and are hydrogen or a monovalent, optionally substituted hydrocarbyl radical,
$R^2$ are identical or different and are monovalent, optionally substituted, aromatic hydrocarbyl radicals bonded via a ring carbon atom to silicon,
a is 0, 1, 2 or 3,
b is 0, 1, 2 or 3, and
c is 0 or 1,
with the proviso that
the sum a+b+c is less than or equal to 3,
in at most 80% of all units of the formula (I), the sum a+c is 2,
in at least 20% of all units of the formula (I), the sum a+c is 1, and
in more than 10% of all units, c is 1,
(A2) organosilicon compounds comprising units of the formula

  (II), in which
R, $R^1$ and $R^2$ have the definition stated for them above,
a' is 0, 1, 2 or 3,
b' is 0, 1, 2 or 3, and
c' is 0, 1, 2 or 3,
with the proviso that
the sum a'+b'+c' is less than or equal to 3,
in more than 80% of all units of the formula (II) the sum a'+c' is 2,
in at most 10% of all units of the formula (II) the sum a'+c' is 1, and
in 1-100% of all units of the formula (II) c' is other than 0,
(B1) filler particles and/or
(B2) organopolysiloxane resins containing units of the formula

  (III), in which
$R^3$ are identical or different and are hydrogen or a monovalent, optionally substituted, SiC-bonded hydrocarbyl radical,
$R^4$ are identical or different and are hydrogen or a monovalent, optionally substituted hydrocarbyl radical,
d is 0, 1, 2 or 3, and
e is 0, 1, 2 or 3,
with the proviso that the sum d+e is less than or equal to 3 and in less than 50% of all units of the formula (III) in the organopolysiloxane resin, the sum d+e is 2,
and optionally (B3) organosilicon compounds which are different from (A1) and (A2) and comprise units of the formula $$R^5{}_g(R^6O)_h SiO_{(4-g-h)/2} \qquad (IV),$$

in which
R$^5$ are identical or different and have a definition stated for R,
R$^6$ are identical or different and have a definition stated for R$^1$,
g is 0, 1, 2 or 3, and
h is 0, 1, 2 or 3,
with the proviso that the sum g+h is less than or equal to 3 and in at least 50% of all units of the formula (IV) in the organosilicon compound, the sum g+h is 2,
(C) optionally, polyether-modified siloxanes,
(D) optionally, organic compounds,
(E) optionally, water, and
(F) optionally, further additives
wherein organosilicon compounds (A1) are silicone resins of one or more of the formulae $$(R^2SiO_{3/2})_k(R_2SiO)_l,$$

$$(R^2SiO_{3/2})_k(R_2SiO)_l(R^2(R^1O)SiO_{2/2})_m,$$

$$(R^2SiO_{3/2})_k(R_2SiO)_l(R^2(R^1O)SiO_{2/2})_m(R^2(R^1O)_2 SiO_{1/2})_n \text{ or}$$

$$(R^2SiO_{3/2})_k(R^2(R^1O)SiO_{2/2})_m,$$

which silicone resins optionally further comprise units of the formulae R$_3$SiO$_{1/2}$ and R$_2$(R$^1$O)SiO$_{1/2}$, and mixtures thereof, and
the coefficients k, l, m and n independently of one another have values greater than or equal to 1.

8. A defoamer composition, comprising
(A1) at least one organosilicon compound comprising units of the formula $$R_a(R^1O)_b R^2{}_c SiO_{(4-a-b-c)/2} \qquad (I),$$

in which
R are identical or different and are a hydrogen atom or a monovalent, SiC-bonded, optionally substituted hydrocarbyl radical which is aliphatic or which is aromatic and is bonded via an aliphatic carbon atom to silicon,
R$^1$ are identical or different and are hydrogen or a monovalent, optionally substituted hydrocarbyl radical,
R$^2$ are identical or different and are monovalent, optionally substituted, aromatic hydrocarbyl radicals bonded via a ring carbon atom to silicon,
a is 0, 1, 2 or 3,
b is 0, 1, 2 or 3, and
c is 0 or 1,
with the proviso that
the sum a+b+c is less than or equal to 3,
in at most 80% of all units of the formula (I), the sum a+c is 2,
in at least 20% of all units of the formula (I), the sum a+c is 1, and
in more than 10% of all units, c is 1,
(A2) organosilicon compounds comprising units of the formula $$R_a(R^1O)_b R^2{}_c SiO_{(4-a'-b'-c')/2} \qquad (II),$$

in which
R, R$^1$ and R$^2$ have the definition stated for them above,
a' is 0, 1, 2 or 3,
b' is 0, 1, 2 or 3, and
c' is 0, 1, 2 or 3, with the proviso that
the sum a'+b'+c' is less than or equal to 3,
in more than 80% of all units of the formula (II) the sum a'+c' is 2,
in at most 10% of all units of the formula (II) the sum a'+c' is 1, and
in 1-100% of all units of the formula (II) c' is other than 0,
(B1) filler particles and/or
(B2) organopolysiloxane resins containing units of the formula $$R^3{}_d(R^4O)_e SiO_{(4-d-e)/2} \qquad (III),$$

in which
R$^3$ are identical or different and are hydrogen or a monovalent, optionally substituted, SiC-bonded hydrocarbyl radical,
R$^4$ are identical or different and are hydrogen or a monovalent, optionally substituted hydrocarbyl radical,
d is 0, 1, 2 or 3, and
e is 0, 1, 2 or 3,
with the proviso that the sum d+e is less than or equal to 3 and in less than 50% of all units of the formula (III) in the organopolysiloxane resin, the sum d+e is 2,
and optionally
(B3) organosilicon compounds which are different from (A1) and (A2) and comprise units of the formula $$R^5{}_g(R^6O)_h SiO_{(4-g-h)/2} \qquad (IV),$$

in which
R$^5$ are identical or different and have a definition stated for R,
R$^6$ are identical or different and have a definition stated for R$^1$,
g is 0, 1, 2 or 3, and
h is 0, 1, 2 or 3,
with the proviso that the sum g+h is less than or equal to 3 and in at least 50% of all units of the formula (IV) in the organosilicon compound, the sum g+h is 2,
(C) optionally, polyether-modified siloxanes,
(D) optionally, organic compounds,
(E) optionally, water, and
(F) optionally, further additives,
wherein organosilicon compounds (A2) are organopolysiloxanes of the formula $$R_{3-p}(R^1O)_p SiO[R_2SiO]_v[R*R^2SiO]_w(R^1O)_p R_{3-p} \qquad (V),$$

which organopolysiloxanes optionally further comprise T units of the formulae R$^2$SiO$_{3/2}$, RSiO$_{3/2}$, R$^2$(R$^1$O)SiO$_{2/2}$, R(R$^1$O)SiO$_{2/2}$, R$^2$(R$^1$O)$_2$SiO$_{1/2}$, R(R$^1$O)$_2$SiO$_{1/2}$ and mixtures thereof in amounts of 0 to 5 mol %,
R* is R or R$^2$,
p is 0 or 1,
v is 0 or an integer, and
w is a positive integer.

9. The defoamer composition of claim 7, wherein 10 to 100 mol % of the SiC-bonded radicals in components (A1) and (A2) are radicals R$^2$.

10. The defoamer composition of claim 8, wherein 10 to 100 mol % of the SiC-bonded radicals in components (A1) and (A2) are radicals R$^2$.

11. The defoamer composition of claim 1, wherein component (B1) comprises at least one silica having a BET surface area of 50 to 800 m$^2$/g.

12. The defoamer composition of claim 1, wherein component (B2) comprises at least one organopolysiloxane resin which consists essentially of R$^3{}_3$SiO$_{1/2}$ (M) and SiO$_{4/2}$ (Q)

units, the molar ratio of M to Q units is in the range from 0.5 to 2.0, and up to 10 wt % of Si-bonded hydroxyl or alkoxy groups are optionally present.

13. The defoamer composition of claim 1, wherein the defoamer composition consists of 10 to 60 wt % of organosilicon compounds (A1),
20 to 70 wt % of organosilicon compounds (A2),
2 to 15 wt % of adjuvants (B1),
2 to 15 wt % of adjuvants (B2),
0 to 15 wt % of adjuvants (B3),
0 to 10 wt % of polyether-modified siloxanes (C),
0 to 20 wt % or organic compounds (D),
0 to 1% of water (E), and
0 to 10% of further additives (F),
based in each case on the total weight of the defoamer composition.

14. A powder comprising a defoamer composition of claim 1, and at least one pulverulent carrier material.

15. A surfactant formulation comprising a defoamer composition of claim 1.

16. A surfactant formulation comprising a powder defoamer composition of claim 14.

17. A method for defoaming and/or for preventing foaming in a medium, comprising adding a defoamer composition of claim 1 to the medium.

18. The method of claim 17, wherein the defoamer composition is added in amounts of 0.1 ppm by weight to 1 wt % to the medium.

* * * * *

UNITED STATES PATENT AND TRADEMARK OFFICE
CERTIFICATE OF CORRECTION

PATENT NO. : 10,744,425 B2  
APPLICATION NO. : 15/742439  
DATED : August 18, 2020  
INVENTOR(S) : Christof Brehm et al.

Page 1 of 1

It is certified that error appears in the above-identified patent and that said Letters Patent is hereby corrected as shown below:

In the Claims

Column 20, Lines 32-33, Claim 8:  
After "$R^6$ are identical or different and have a definition stated for"  
Delete "R'" and  
Insert -- $R^1$ --

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*